(12) United States Patent
Uematsu et al.

(10) Patent No.: US 10,443,702 B2
(45) Date of Patent: Oct. 15, 2019

(54) BREATHER STRUCTURE OF ACTUATOR

(71) Applicant: Nidec Tosok Corporation, Zama-shi, Kanagawa (JP)

(72) Inventors: Yutaka Uematsu, Zama (JP); Kazumi Shinkai, Zama (JP); Shun Kato, Zama (JP); Shuichi Kinjo, Zama (JP); Kohei Osuga, Zama (JP); Tadayuki Hatsuda, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 15/936,530

(22) Filed: Mar. 27, 2018

(65) Prior Publication Data

US 2018/0283524 A1    Oct. 4, 2018

(30) Foreign Application Priority Data

Mar. 31, 2017    (JP) .................................. 2017-070036

(51) Int. Cl.
*F16H 57/027*    (2012.01)
*H02K 5/10*    (2006.01)
(Continued)

(52) U.S. Cl.
CPC ............. *F16H 57/027* (2013.01); *H02K 5/10* (2013.01); *H02K 7/116* (2013.01); *H02K 5/15* (2013.01);
(Continued)

(58) Field of Classification Search
CPC ....... F16H 57/027; F16H 57/031; H02K 5/10; H02K 5/15
See application file for complete search history.

(56) References Cited

U.S. PATENT DOCUMENTS

| 4,506,562 A * | 3/1985 | Yamaura ............... F16H 57/027 |
| | | 137/846 |
| 6,015,444 A * | 1/2000 | Craft ..................... F16H 57/027 |
| | | 220/371 |

(Continued)

FOREIGN PATENT DOCUMENTS

| DE | 2124434 A1 * | 11/1972 | ............. B62D 55/13 |
| DE | 202015106214 U1 * | 1/2016 | ........... F16H 57/027 |

(Continued)

OTHER PUBLICATIONS

EPO Translation of the Description of JP 4604322 B2, Kuroki et al., Jan. 5, 2011. (Year: 2019).*

*Primary Examiner* — Daniel D Yabut
(74) *Attorney, Agent, or Firm* — Keating & Bennett, LLP

(57) ABSTRACT

There is provided a breather structure of an actuator in which the breather structure is provided in a housing of the actuator, the breather structure including: a recessed groove positioned on an outer surface of the housing; a breathing hole which is positioned on a bottom surface of the recessed groove and passes through the housing in a first direction; a filter fixed to an inside of the housing so that the filter closes an opening of the breathing hole; a lid body which partially covers a region of the recessed groove including the breathing hole from an outside of the housing when viewed from the first direction; a breather opening portion positioned at a portion of the recessed groove exposed from the lid body; and a protrusion portion which protrudes from the bottom surface of the recessed groove to a side of the lid body.

4 Claims, 5 Drawing Sheets

(51) Int. Cl.
*H02K 7/116* (2006.01)
*H02K 5/173* (2006.01)
*H02K 5/15* (2006.01)

(52) U.S. Cl.
CPC ....... *H02K 5/1732* (2013.01); *H02K 2205/09* (2013.01)

(56) References Cited

U.S. PATENT DOCUMENTS

| | | | |
|---|---|---|---|
| 7,597,114 B2 * | 10/2009 | Buckingham | F16K 24/044 |
| | | | 137/429 |
| 8,276,479 B2 * | 10/2012 | Shinbo | F16H 57/027 |
| | | | 74/606 R |
| 2006/0171065 A1 | 8/2006 | Akamatsu et al. | |
| 2007/0295160 A1 * | 12/2007 | Mizutani | H02K 5/10 |
| | | | 74/606 R |
| 2011/0030983 A1 * | 2/2011 | Kakiuchi | B25D 17/245 |
| | | | 173/46 |
| 2013/0180357 A1 * | 7/2013 | Valliere | F16H 57/027 |
| | | | 74/608 |

FOREIGN PATENT DOCUMENTS

| | | | | |
|---|---|---|---|---|
| JP | 59219527 A | * | 12/1984 | ............ F16D 13/72 |
| JP | 10059134 A | * | 3/1998 | ................ B60S 1/08 |
| JP | 2006-216157 A | | 8/2006 | |
| JP | 2007-124798 A | | 5/2007 | |
| JP | 2010-063224 A | | 3/2010 | |
| JP | 4604322 B2 | * | 1/2011 | .......... F16H 57/027 |
| JP | 2015-090726 A | | 5/2015 | |

* cited by examiner

BREATHER STRUCTURE OF ACTUATOR

CROSS REFERENCE TO RELATED APPLICATIONS

This application claims the benefit of priority to Japanese Patent Application No. 2017-070036 filed on Mar. 31, 2017. The entire contents of this application are hereby incorporated herein by reference.

BACKGROUND OF THE INVENTION

1. Field of the Invention

The present invention relates to a breather structure of an actuator.

2. Description of the Related Art

In the related art, a breather for pressure adjustment is provided in an actuator having waterproofness.

For example, as a breather structure, as described in Japanese Unexamined Patent Application Publication No. 2010-063224, a configuration in which a vent filter is provided with a casing at the inside thereof is known.

Although the vent filter adheres to the inside of the casing at an opening portion of the breathing hole, in a case where the high-pressure liquid flows through the breathing hole, there is a concern that the vent filter is peeled off or damaged by the pressure of the liquid.

SUMMARY OF THE INVENTION

An object of an aspect of the present invention is to provide a breather structure of an actuator that can protect a filter even in a case where a high-pressure liquid flows in.

According to an aspect of the present invention, there is provided a breather structure of an actuator in which the breather structure is provided in a housing of the actuator, the breather structure including: a recessed groove positioned on an outer surface of the housing; a breathing hole which is positioned on a bottom surface of the recessed groove and passes through the housing in a first direction; a filter fixed to an inside of the housing so that the filter closes an opening of the breathing hole; a lid body which partially covers a region of the recessed groove including the breathing hole from an outside of the housing when viewed from the first direction; a breather opening portion positioned at a portion of the recessed groove exposed from the lid body; and a protrusion portion which protrudes from the bottom surface of the recessed groove to a side of the lid body.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Hereinafter, the electric actuator of an embodiment will be described with reference to the drawings.

Figure 1:
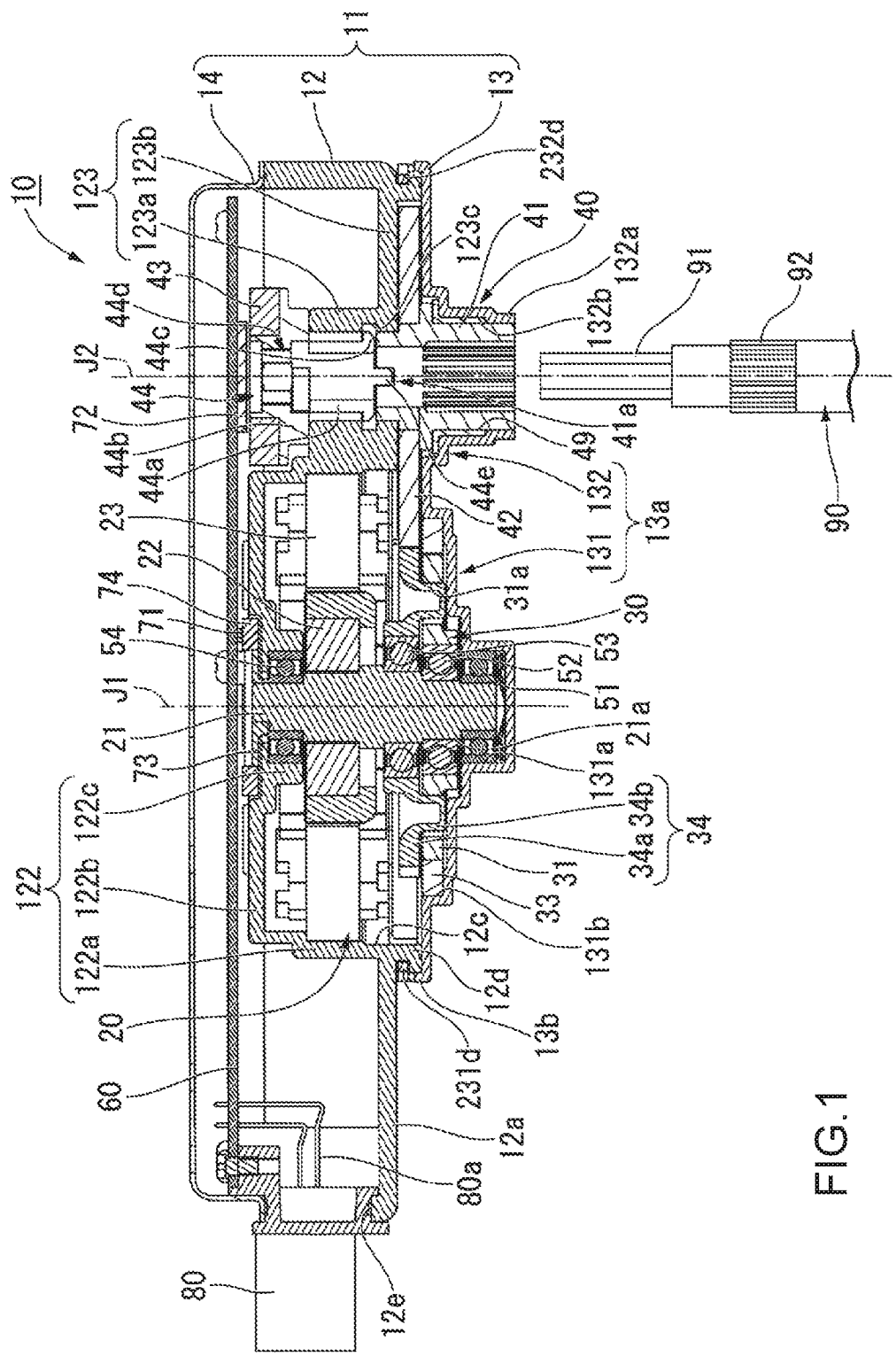
FIG. 1 is a sectional view of an electric actuator of an embodiment.
Figure 2:
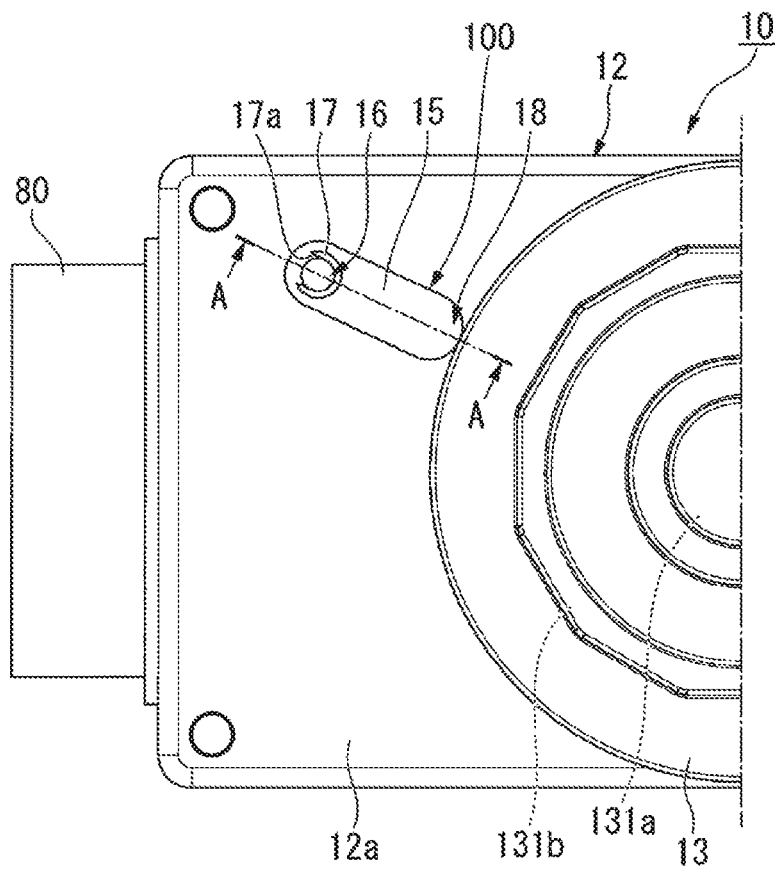
FIG. 2 is a partial plan view of the electric actuator of the embodiment.
Figure 3:
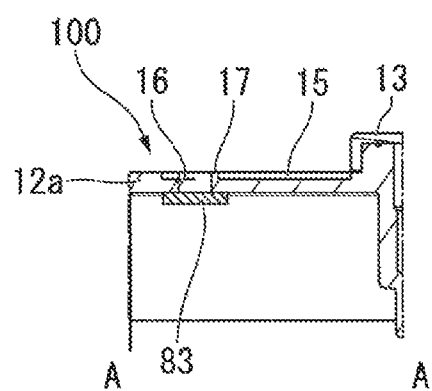
FIG. 3 is a sectional view taken along line A-A in FIG. 2.

FIG. 1 is a sectional view of an electric actuator according to this embodiment. FIG. 2 is a partial plan view of the electric actuator of this embodiment. FIG. 3 is a sectional view taken along line A-A in FIG. 2.

The electric actuator 10 of this embodiment is used by being connected to a driven shaft 90. The electric actuator 10 rotates the driven shaft 90 around axis thereof.

The electric actuator 10 includes a housing 11, a motor unit 20 which has a motor shaft 21 extending in the axial direction of a first central axis J1, a speed reduction mechanism 30, an output portion 40, a control board 60, a first bearing 51, a second bearing 52, a third bearing 53, a fourth bearing 54, and an external connector 80. The first bearing 51 to the fourth bearing 54 are, for example, ball bearings. The axial direction of the first central axis J1 is parallel to an up and down direction in FIG. 1.

In the following description, the axial direction of the first central axis J1 is simply referred to as "axial direction", the upper side of FIG. 1 in the axial direction is simply referred to as "upper side", the lower side of FIG. 1 in the axial direction is simply referred to as "lower Side". In addition, the radial direction about the first central axis J1 is simply referred to as "radial direction", and the circumferential direction about the first central axis J1 is simply referred to as "circumferential direction". The upper side and the lower side are merely names for explaining the relative positional relationship between the respective portions, and the actual disposition relationship or the like may be a disposition relationship or the like other than the disposition relationship or the like indicated by these names. The upper side corresponds to the other side in the axial direction, and the lower side corresponds to a side in the axial direction.

The housing 11 has a housing main body 12 that accommodates the motor unit 20, a speed reduction mechanism 30, and an output portion 40, a lower cover member 13 that is disposed on the lower side of the housing main body 12, and an upper cover member 14 that is disposed on the upper side of the housing main body 12.

The housing main body 12 is a bottomed box-shaped container opened to the upper side. The housing main body 12 has a bottom wall 12a expanding in a direction orthogonal to the first central axis J1 and a circumferential wall 12b extending upward from the outer circumferential end of the bottom wall 12a. The bottom wall 12a has a through-hole 12c which passes through the bottom wall 12a in the axial direction and a tubular protrusion wall portion 12d which extends downward in the axial direction from the end edge of the through-hole 12c. In other words, the housing 11 has a through-hole 12c and a protrusion wall portion 12d.

The housing main body 12 has a motor holding portion 122 which holds the motor unit 20 and an output portion holding portion 123 which holds the output portion 40. The motor holding portion 122 and the output portion holding portion 123 are disposed in parallel in the radial direction inside the through-hole 12c. The housing main body 12 has a through portion 12e passing through the circumferential wall 12b in the radial direction. An external connector 80 is inserted into the through portion 12e and fixed thereto.

The motor holding portion 122 has a cylindrical tube portion 122a extending in the axial direction and an annular lid portion 122b expanding inward from the upper end of the tube portion 122a in the radial direction. The opening portion on the lower side of the tube portion 122a is positioned inside the through-hole 12c. The tube portion 122a surrounds the outside of the motor unit 20 in the radial direction. The lid portion 122b covers the upper side of the motor unit 20. The lid portion 122b has a cylindrical bearing holding portion 122c that holds the fourth bearing 54 in the center.

The output portion holding portion 123 is disposed adjacent to the motor holding portion 122 inside the through-hole 12c in the radial direction. The output portion holding portion 123 includes a cylindrical tube portion 123a extending in the axial direction about the second central axis J2, and a supporting wall portion 123b expanding from the lower end of the tube portion 123a outward in the radial direction and connected to a circumferential edge of the through-hole 12c.

The protrusion wall portion 12d surrounding the through-hole 12c accommodates a portion of gears of the speed reduction mechanism 30 and the output portion 40. Among a region surrounded by the protrusion wall portion 12d, a region that overlaps the motor holding portion 122 in the axial direction is a region that accommodates the gear of the speed reduction mechanism 30 and a region that overlaps the output portion holding portion 123 in the axial direction is a region which accommodates gears of the output portion 40.

The lower cover member 13 is fixed to the protrusion wall portion 12d of the housing main body 12. The lower cover member 13 closes the through-hole 12c from the lower side. The lower cover member 13 has a lid plate portion 13a expanding in a direction orthogonal to the axial direction and a tubular side wall portion 13b extending upward from an end edge of the lid plate portion 13a in the axial direction. The side wall portion 13b surrounds the outer periphery of the protrusion wall portion 12d of the housing main body 12 and faces in a direction orthogonal to the axial direction. The side wall portion 13b of the lower cover member 13 is caulked and fixed to the protrusion wall portion 12d at a plurality of positions.

The lower cover member 13 has a speed reduction mechanism cover 131 for covering the speed reduction mechanism 30 and an output portion cover 132 in the axial direction for covering the output portion 40 in the axial direction.

The speed reduction mechanism cover 131 is in a form of a disk about the first central axis J1 when viewed from the lower side. The speed reduction mechanism cover 131 has a plurality of accommodation recessed portions 131a and 131b that are recessed downward. Both accommodation recessed portions 131a and 131b are a bottomed cylindrical shape about the first central axis J1. The accommodation recessed portion 131a is disposed in the center portion in the radial direction and accommodates the first bearing 51. The accommodation recessed portion 131b is positioned above the accommodation recessed portion 131b and accommodates the gear of the speed reduction mechanism 30.

The output portion cover 132 is in a form of a disk about the second central axis J2, when viewed from the lower side. The output portion cover 132 has a cylindrical tube portion 132a extending downward in the axial direction about the second central axis J2. The tube portion 132a has a through-hole 132b passing through the output portion cover 132. A cylindrical bush 49 is disposed inside the tube portion 132a. The bush 49 is fitted in the through-hole 132b. The bush 49 has a flange portion projecting outwardly at an upper end portion thereof in the radial direction. The flange portion of the bush 49 comes into contact with the upper surface of the output portion cover 132 from above.

Returning to FIG. 1, the upper cover member 14 is fixed to the upper end portion of the circumferential wall 12b of the housing main body 12. The upper cover member 14 closes the upper opening of the housing main body 12. A control board 60 is disposed between the upper surface of the motor holding portion 122 and the upper cover member 14. The control board 60 has a plate shape that expands in a direction orthogonal to the axial direction. The control board 60 is fixed to a position covering the motor holding portion 122 and the output portion holding portion 123 from the upper side in the housing main body 12. The control board 60 is electrically connected to a coil wire extending from the motor unit 20 and a metal terminal 80a extending from the external connector 80.

The motor unit 20 has a motor shaft 21, a rotor 22, and a stator 23. The motor shaft 21 is rotatably supported around the first central axis J1 by the first bearing 51 and the fourth bearing 54. The motor shaft 21 extends downward from the rotor 22 and is connected to the speed reduction mechanism 30.

The rotor 22 has a cylindrical rotor core fixed to the outer circumferential surface of the motor shaft 21 and a magnet fixed to the outer circumferential surface of the rotor core. The stator 23 includes an annular stator core that surrounds the outside of the rotor 22 in the radial direction, and a plurality of coils that are attached to the stator core. The stator 23 is fixed to the inner circumferential surface of the tube portion 122a.

A ring-shaped sensor magnet 74 for the motor unit is attached to the upper end of the motor shaft 21 via a magnet holder 73. The magnet holder 73 and the sensor magnet 74 for the motor unit are disposed between the lid portion 122b of the motor holding portion 122 and the control board 60. A motor unit sensor 71 is disposed at a position facing the sensor magnet 74 for the motor unit of the control board 60. The motor unit sensor 71 is, for example, a Hall element or a magnetoresistive element (MR element). For example, three motor unit sensors 71 each comprising a Hall element are disposed around the axis of the first central axis J1.

The speed reduction mechanism 30 is disposed below the motor unit 20. The motor shaft 21 passes through the speed reduction mechanism 30 in the axial direction. The speed reduction mechanism 30 is disposed outward of the lower portion of the motor shaft 21 in the radial direction. The speed reduction mechanism 30 is accommodated between the motor unit 20 and the speed reduction mechanism cover 131. The speed reduction mechanism 30 has an external gear 31, an internal gear 33, and an output gear 34.

The external gear 31 has a substantially annular plate shape expanding in a plane orthogonal to the axial direction about an eccentric portion 21a of the motor shaft 21. A gear portion is provided on the outside surface of the external gear 31 in the radial direction. The external gear 31 is connected to the eccentric portion 21*a* via the second bearing 52. The external gear 31 has a plurality of pin holes 31*a* passing through the external gear 31 in the axial direction. For example, eight pin holes 31*a* are provided. The plurality of pin holes 31*a* are disposed at equal intervals around the central axis of the external gear 31 over the entire circumference thereof.

The internal gear 33 is fixed while surrounding the outside of the external gear 31 in the radial direction and meshes with the external gear 31. The internal gear 33 is substantially annular about the first central axis J1. The outer shape of the internal gear 33 is a polygonal shape (a regular dodecagonal shape in this embodiment) and is fitted and fixed to the accommodation recessed portion 131*b* of the speed reduction mechanism cover 131 having the same polygonal shape. A gear portion is provided on the inner circumferential surface of the internal gear 33. The gear portion of the internal gear 33 meshes with the gear portion of the external gear 31.

The output gear 34 is an external gear disposed on the upper side of the external gear 31. The output gear 34 has an annular portion 34*a* and a plurality of carrier pins 34*b*. The annular portion 34*a* is an annular plate shape which expands in the radial direction about the first central axis J1. The plurality of carrier pins 34*b* have a columnar shape protruding downward from the lower surface of the annular portion 34*a*. For example, eight carrier pins 34*b* are provided. The plurality of carrier pins 34*b* are disposed at equal intervals about the first central axis J1 around one circumference thereof. The carrier pin 34*b* is inserted into the pin hole 31*a*. The output gear 34 meshes with a drive gear 42 to be described below.

The output portion 40 is a portion that outputs the driving force of the electric actuator 10. The output portion 40 includes an output shaft 41, a drive gear 42, a sensor magnet 43 for an output portion, and a magnet holder 44. The output portion 40 is held in the output portion holding portion 123, and the output portion cover 132.

The output shaft 41 has a cylindrical shape extending along the second central axis J2. The output shaft 41 has spline grooves in the lower portion of the inner circumferential surface thereof. The output shaft 41 has a recessed portion 41*a* recessed in the axial direction at an upper end thereof. The drive gear 42 is fixed to the outer circumferential surface of the output shaft 41. The drive gear 42 is in a shape of an annular plate expanding about the second central axis J2 in the radial direction. The lower portion of the output shaft 41 is inserted into the bush 49 of the output portion cover 132 from the upper side. The upper portion of the output shaft 41 is inserted from the lower side into the tube portion 123*a* of the output portion holding portion 123.

The magnet holder 44 is a substantially cylindrical member extending along the second central axis J2. The magnet holder 44 has a tube portion 44*a* extending in the axial direction and an annular flange portion 44*b* expanding from the upper portion of the tube portion 44*a* in the radial direction. An annular sensor magnet 43 for the output portion is fixed to the upper surface of the flange portion 44*b*.

The tube portion 44*a* of the magnet holder 44 is inserted into the tube portion 123*a* of the output portion holding portion 123. The magnet holder 44 has a movement suppression portion 44*c* that is a protrusion protruding outward from the outer circumferential surface of the lower end portion of the tube portion 44*a* in the radial direction. The movement suppression portion 44*c* is inserted into a recessed groove 123*c* provided on the inner circumferential surface of the tube portion 123*a* and extending in the circumferential direction thereof. The movement suppression portion 44*c* suppresses the axial movement of the magnet holder 44. The magnet holder 44 has a hexagonal hole portion 44*d* having a hexagonal cross section on the upper side of the inner circumferential surface. The magnet holder 44 has a protrusion portion 44*e* protruding downward in the axial direction at the lower end of the tube portion 44*a*. The protrusion portion 44*e* is inserted into the recessed portion 41*a* of the output shaft 41.

The sensor magnet 43 for the output portion is disposed between the output portion holding portion 123 and the control board 60. An output portion sensor 72 is disposed at a position facing the sensor magnet for output portion 43 of the control board 60. The output portion sensor 72 is, for example, an MR element. As the output portion sensor 72, an MR element and a Hall element may be used in combination.

The output portion 40 is connectable with the driven shaft 90. The driven shaft 90 has a hexagonal portion 91 having a regular hexagonal cross-section and a spline portion 92 positioned on the lower side (proximal end side of driven shaft 90) than the hexagonal portion 91, at a distal end portion inserted into the electric actuator 10. When the hexagonal portion 91 is fitted into the hexagonal hole portion 44*d* of the magnet holder 44, the driven shaft 90 and the magnet holder 44 are connected to each other. In addition, the spline portion 92 and the spline grooves of the output shaft 41 are fitted to each other, whereby the driven shaft 90 and the output shaft 41 are connected to each other.

Figure 4:
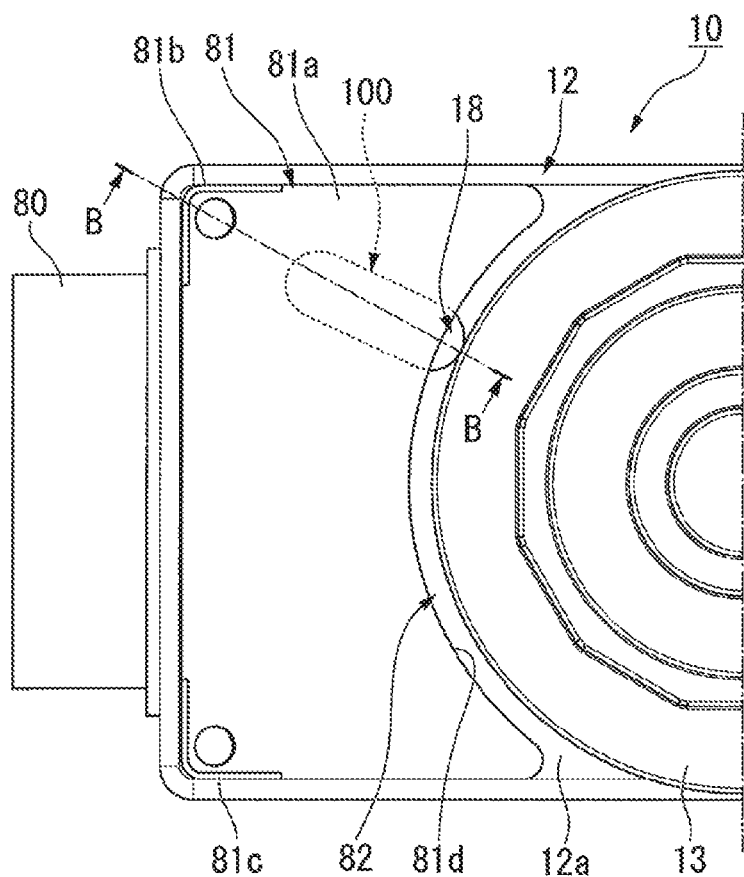
FIG. 4 is a partial plan view of the electric actuator having a connection bracket.
Figure 5:
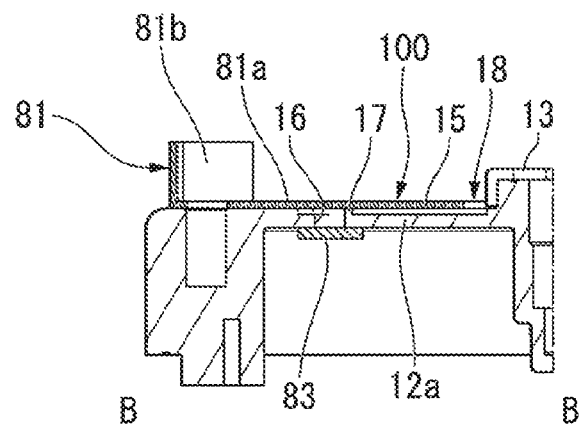
FIG. 5 is a sectional view taken along line B-B of FIG. 4.

Hereinafter, a breather structure included in the electric actuator 10 of this embodiment will be described. FIG. 4 is a partial plan view of the electric actuator 10 provided with a connection bracket. FIG. 5 is a sectional view taken along line B-B of FIG. 4.

The electric actuator 10 has the connection bracket 81 on the outer surface of the bottom wall 12*a* on the side of the output portion cover 132. As shown in FIGS. 4 and 5, the connection bracket 81 has a planar shape that substantially covers the bottom wall 12*a* when viewed from below. The connection bracket 81 has a flat plate portion 81*a* facing the outer surface of the bottom wall 12*a* and corner walls 82*b* and 82*c* extending downward from the corner portion of the bottom wall 12*a*. The corner walls 82*b* and 82*c* are L-shaped when viewed from below.

The three sides of the flat plate portion 81*a* are straight lines extending along the outside of the housing main body 12. A side 81*d* of the flat plate portion 81*a* facing the lower cover member 13 has an arc shape when viewed in the axial direction. Between the side 81*d* and the lower cover member 13, there is an arcuate gap 82 extending along the side 81*d*.

The electric actuator 10 has a breather structure 100 that connects the inside portion and the outside portion of the housing 11 with a ventilation path between the connection bracket 81 and the bottom wall 12*a*.

As shown in FIGS. 2 to 5, the breather structure 100 includes a recessed groove 15, a breathing hole 16, and a wall portion 17, which are provided in the bottom wall 12*a* of the housing main body 12, a connection bracket 81, and a filter 83. The breather structure 100 has a breather opening portion 18 that opens between the connection bracket 81 and the lower cover member 13. The breather structure 100 has the ventilation path extending from the breather opening portion 18 to the inside of the housing 11 via the recessed groove 15 and the breathing hole 16.

The recessed groove 15 is a linear recessed groove extending from the vicinity of the outer circumferential end of the lower cover member 13 to the outside in the radial direction on the outer surface of the bottom wall 12a. Both ends of the recessed groove 15 in the extended direction are semicircular shapes whose width decreases toward the tip. The breathing hole 16 is a through-hole that passes through the bottom wall 12a in the axial direction (first direction). The breathing hole 16 opens to the bottom surface of the recessed groove 15. The breathing hole 16 is positioned at the end portion of the recessed groove 15 on the side opposite to a side of the lower cover member 13. The filter 83 closes the opening of the breathing hole 16 on a side of the inner surface of the bottom wall 12a. The filter 83 is a vent filter.

As shown in FIG. 5, the wall portion 17 is a protrusion portion extending from the bottom surface of the recessed groove 15 to a side of the connection bracket 81. As shown in FIG. 2, the wall portion 17 extends in an arc shape along the circumference of the breathing hole 16 inside the recessed groove 15. The height of the wall portion 17 is equal to the depth of the recessed groove 15.

As shown in FIG. 5, the connection bracket 81 is disposed in contact with the outer surface of the bottom wall 12a. Accordingly, a region of the recessed groove 15 is partially covered by the connection bracket 81, and the inside of the recessed groove 15 becomes a tubular ventilation path. In other words, the connection bracket 81 of this embodiment is a lid body that partially covers the recessed groove 15 in the breather structure 100. The end portion of the recessed groove 15 on a side of the lower cover member 13 is exposed to the outside of the connection bracket 81 to become the breather opening portion 18.

In the breather structure 100, since the connection bracket 81 covers a portion of the recessed groove 15 where the breathing hole 16 is provided, the breathing hole 16 is connected to the external space via a ventilation path surrounded by the recessed groove 15 and the connection bracket 81 and a breather opening portion 18. By providing an elongated ventilation path, the liquid such as water flowing into the interior from the breather opening portion 18 surely collides with the wall surface of the recessed groove 15 or the connection bracket 81 before reaching the breathing hole 16. In addition, since the wall portion 17 is disposed in the recessed groove 15, the liquid flowing into the ventilation path also collides with the wall portion 17. By these actions, since the momentum of the liquid traveling through the ventilation path is weakened, flowing of the high-pressure liquid into the breathing hole 16 can be suppressed. As a result, the filter 83 inside the housing 11 can be protected from the liquid. In this embodiment, since the protrusion portion disposed in the recessed groove 15 is formed as the wall portion 17 having a shape extending along the circumference of the breathing hole 16, the area of blocking the path of the liquid flowing into the ventilation path becomes large, and the liquid momentum is effectively weakened.

The wall portion 17 has a through portion 17a passing through the wall portion 17 in the thickness direction. The thickness direction of the wall portion 17 is a direction orthogonal to a direction (the first direction) in which the breathing hole 16 passes through the bottom wall 12a. The through portion 17a extends from the breathing hole 16 to the side opposite to the breather opening portion 18 when viewed from the lower side. In other words, the wall portion 17 is positioned between the breathing hole 16 and the breather opening portion 18.

With the above configuration, the liquid flowing into the ventilation path always collides with the wall portion 17 before reaching the breathing hole 16. Accordingly, since the momentum of the liquid is weakened, the filter 83 can be more reliably protected.

In addition, by providing the through portion 17a in the wall portion 17, even when liquid or foreign matter enters the ventilation path and reaches the wall portion 17, ventilation between the breathing hole 16 and the inside of the recessed groove 15 is likely to be secured.

The through portion 17a may be a ventilation path that connects the inside and the outside of the wall portion 17 of the breathing hole 16 in the radial direction. Therefore, the through portion 17a may be a portion which is lower in the wall portion 17 than in other portions. The through portion 17a may be a through-hole that is open on the side surface of the wall portion 17.

In this embodiment, the wall portion 17 surrounds equal to or more than half of the circumference of the breathing hole 16 when viewed from the lower side. With this configuration, the introduction of the liquid flowing into the ventilation path to the breathing hole 16 can be suppressed. The wall portion 17 may surround ¾ equal to or more of the circumference of the breathing hole 16. Accordingly, since the wall portion 17 surrounds three sides out of the four sides among the breathing hole 16, the liquid is unlikely to enter.

In this embodiment, a connection bracket 81 is used as a lid body constituting the breather structure 100. This eliminates the need for separately providing a lid body covering the recessed groove 15. Therefore, the number of members can be reduced, and the filter 83 can be protected with a simple structure.

The electric actuator 10 of this embodiment can be used, for example, an actuator for a vehicle such as an actuator for driving manual shafts, an actuator for driving a clutch, and an actuator for opening and closing a tailgate, or the like in a transmission device. Since the actuator for a vehicle is installed in a state of being exposed to the bottom surface of the vehicle or the like, it is likely to be exposed to water during operation or car wash. Since the electric actuator 10 of this embodiment is provided with the breather structure 100 capable of protecting the filter from the inflow of liquid, it is suitable as an actuator of a vehicle. In addition, the electric actuator 10 is not limited to vehicles and can be used for other purposes.

Figure 6:
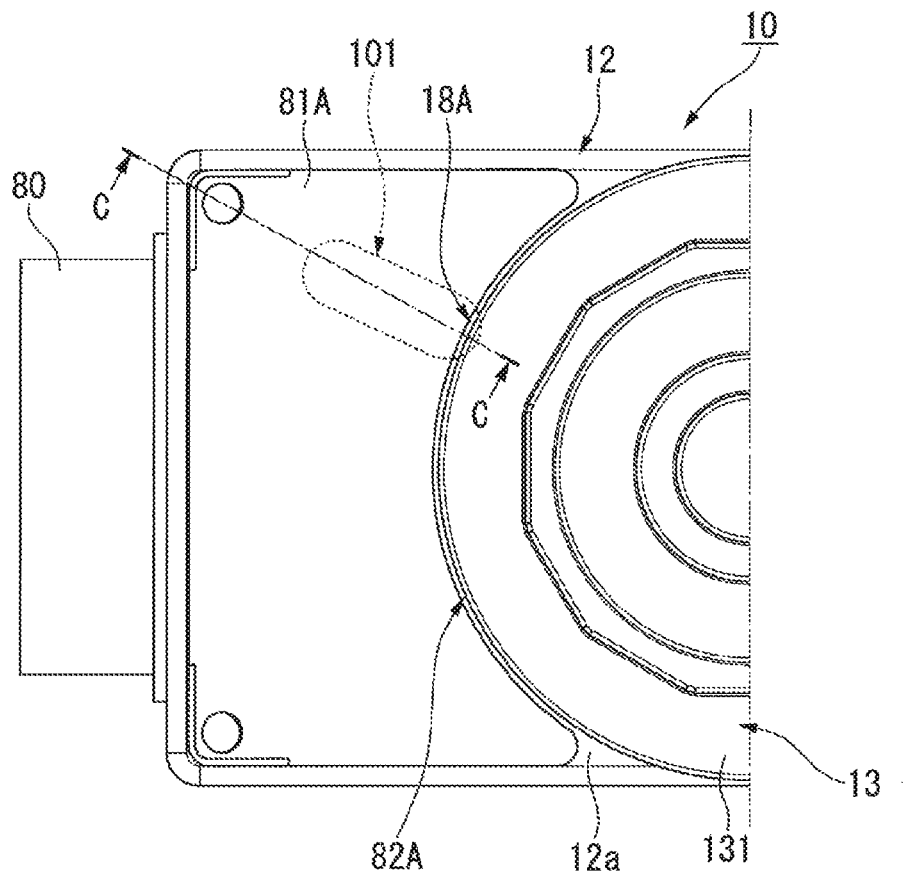
FIG. 6 is a partial plan view of the electric actuator having the breather structure of the first modification example.
Figure 7:
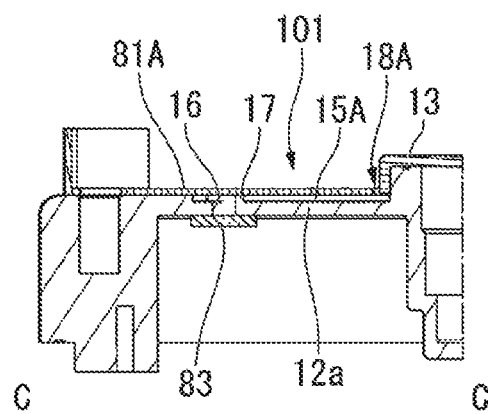
FIG. 7 is a sectional view taken along line C-C of FIG. 6.

FIG. 6 is a partial plan view of the electric actuator having the breather structure of the first modification example, and FIG. 7 is a sectional view taken along the line C-C of FIG. 6.

The breather structure 101 of the first modification example shown in FIGS. 6 and 7 has a recessed groove 15A, a breathing hole 16, a wall portion 17, a breather opening portion 18A, a connection bracket 81A, and a filter 83.

The end portion of the recessed groove 15A on a side of the lower cover member 13 extends to a position overlapping the lower cover member 13 when viewed from the lower side in the breather structure 101 of the first modification example. Specifically, the recessed groove 15A extends to a position overlapping the speed reduction mechanism cover 131 when viewed from the lower side. In other words, in this embodiment, the speed reduction mechanism cover 131 is a portion of the lid body of the breather structure 101.

In this embodiment, the speed reduction mechanism cover 131 (lower cover member 13) may further extend outward in the radial direction and has a shape covering the recessed groove 15A. In this case, the speed reduction mechanism cover 131 is a lid body of a breather structure 101.

The connection bracket 81A extends closer to the lower cover member 13 than the connection bracket 81 shown in FIG. 4. The width of the gap 82A between the connection bracket 81A and the lower cover member 13 is narrower than that of the gap 82 shown in FIG. 4. The breather opening portion 18A is positioned at a portion of the recessed groove 15A that is exposed to the gap 82. Since the breather structure 101 of the first modification example has a narrow opening area of the breather opening portion 18A, even in a case where the electric actuator 10 is exposed to a high-pressure liquid, the liquid is unlikely to enter the inside portion of the breather opening portion 18A. Accordingly, filter 83 is effectively protected.

In the embodiment described above and the first modification example, although the connection bracket 81 and 81A and the speed reduction mechanism cover 131 of the lower cover member 13 are configurations having lid body of the breather structures 100 and 100A, the configurations are not limited thereto. For example, a portion of the casing of a device (for example, robot or the like) connected to the electric actuator 10 may be used as a lid body of the breather structure 100 and 100A.

Figure 8:
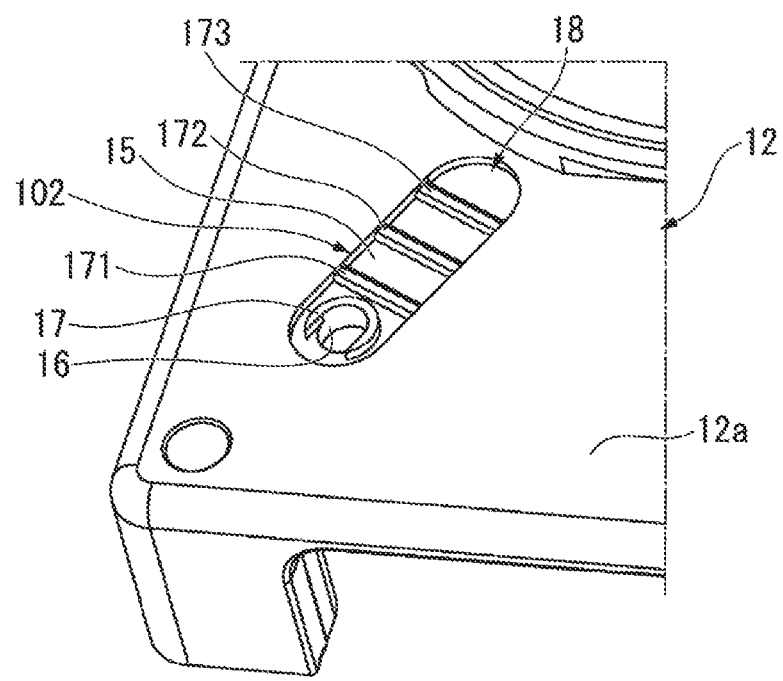
FIG. 8 is a partial perspective view of a housing main body having a breather structure according to a second modification example.

FIG. 8 is a partial perspective view of the housing main body 12 having the breather structure of the second modification example.

The breather structure 102 of the second modification example shown in FIG. 8 has a recessed groove 15, a breathing hole 16, a wall portion 17, a breather opening portion 18, and three protrusion portions 171, 172, and 173. The breather structure 102 of the second modification example is configured so that three protrusion portions 171 to 173 are disposed in the recessed groove 15 in the breather structure 100 of the embodiment.

The protrusion portions 171 to 173 protrude downward from the bottom surface of the recessed groove 15. The protrusion portions 171 to 173 have a shape extending linearly in the width direction of the recessed groove 15 when viewed from the lower side. The protrusion portions 171 to 173 are equally disposed between the breather opening portion 18 and the breathing hole 16. The heights of the protrusion portions 171 to 173 are smaller than the depth of the recessed groove 15. Therefore, when the connection bracket 81 is disposed on the bottom wall 12a, there is a gap between the protrusion portions 171 to 173 and the connection bracket 81. Accordingly, the protrusion portions 171 to 173 do not block the ventilation path from the breather opening portion 18 to the breathing hole 16.

In the breather structure 102 of the second modification example having the configuration described above, a plurality of protrusion portions 171 to 173 are disposed in the ventilation path between the breathing hole 16 and the breather opening portion 18. Accordingly, since the ventilation path becomes narrower at the position of the protrusion portions 171 to 173, even if the liquid flows into the breather opening portion 18, the liquid is unlikely to enter a side of the breathing hole 16. In addition, since the liquid collides with the protrusion portions 171 to 173, The momentum of the liquid is weakened. As a result, the liquid is unlikely to flow into the breathing hole 16 and the internal filter 83 can be more securely protected.

Figure 9:
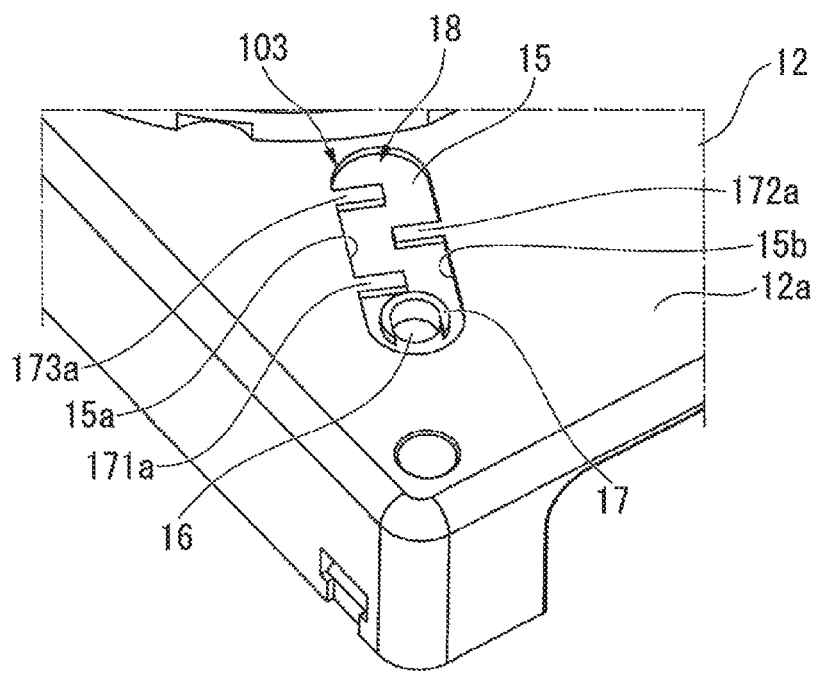
FIG. 9 is a partial perspective view of a housing main body having a breather structure according to a third modification example.

FIG. 9 is a partial perspective view of the housing main body 12 having the breather structure of the third modification example.

The breather structure 103 of the third modification example shown in FIG. 9 has a recessed groove 15, a breathing hole 16, a wall portion 17, a breather opening portion 18, and three protrusion portions 171a, 172a, and 173a. In the breather structure 103 of the third modification example, the shapes of the three protrusion portions 171a, 172a, and 173a are different from those of the breather structure 102 of the second modification example.

In the breather structure 103, the protrusion portions 171a, 172a, and 173a each is about half of the width of the recessed groove 15. The protrusion portions 171a and 173a extend from one side surface 15a of the recessed groove 15 to the other side surface 15b of the recessed groove 15. The protrusion portion 172a extends from the side surface 15b of the recessed groove 15 to the side surface 15a of the recessed groove 15. The protrusion portions 171a, 172a, and 173a are disposed in the zigzag along the extending direction of the recessed groove 15. Here, the zigzag disposition means that a plurality of protrusion portions protrude in a direction orthogonal to the extending direction of the recessed groove 15. The heights of the protrusion portions 171a, 172a, and 173a coincide with the depth of the recessed groove 15. Therefore, when the connection bracket 81 is disposed on the bottom wall 12a, the protrusion portions 171a, 172a, and 173a come into contact with the surface of the connection bracket 81 and partially block the ventilation path.

With the configuration described above, the breather structure 103 has a shape in which the ventilation path extending from the breather opening portion 18 to the breathing hole 16 meanders with respect to the direction in which the recessed groove 15 extends. Accordingly, the liquid is unlikely to flow toward the breathing hole 16 even if liquid flows from the breather opening portion 18. In addition, the liquid momentum is weakened, by the liquid colliding with the protrusion portions 171a, 172a, and 173a. As a result, the liquid is unlikely to flow into the breathing hole 16, and thus the internal filter 83 can be more reliably protected.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric actuator, comprising:
a motor and a speed reduction mechanism in a housing;
a recessed groove positioned on an outer surface of the housing;
a breathing hole which is positioned on one side of a bottom surface of the recessed groove and passes through the housing in a first direction;
a filter fixed to the housing and covering the breathing hole from an inside of the housing;
a lid body is fixed to the housing, the lid body partially covering a region of the recessed groove and an entirety of the breathing hole from an outside of the housing when viewed from the first direction;
a breather opening portion positioned at a portion of the recessed groove exposed from the lid body; and
a protrusion portion which protrudes from the bottom surface of the recessed groove to a side of the lid body, the lid body covering an upper end of the protrusion portion when viewed from the first direction; wherein a portion of the protrusion portion is positioned between the breather opening portion and the breathing hole in a second direction that is perpendicular to the first direction;

the protrusion portion is defined by an arcuate wall portion extending along a circumference of the breathing hole, and including a through portion passing though the wall portion in the second direction; and a total height of the wall portion in the first direction is equal to a total depth of the recessed groove in the first direction.

2. The actuator according to claim 1, wherein the wall portion surrounds equal to or more than half of the circumference of the breathing hole.

3. The actuator according to claim 1, wherein the lid body is a connection bracket of the actuator.

4. The actuator according to claim 1, wherein the housing includes a housing main body that holds the speed reduction mechanism and a speed reduction mechanism cover, and the lid body is the speed reduction mechanism cover of the actuator.

\* \* \* \* \*